(12) United States Patent
Nakagaki et al.

(10) Patent No.: US 6,491,504 B2
(45) Date of Patent: Dec. 10, 2002

(54) VIBRATION-DAMPING DEVICE FOR VEHICLE PUMP

(75) Inventors: Osamu Nakagaki; Tatsuo Suzuki; Tetsuo Asano, all of Nishikasugai-gun (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/842,260

(22) Filed: Apr. 26, 2001

(65) Prior Publication Data

US 2002/0015647 A1 Feb. 7, 2002

(30) Foreign Application Priority Data

Apr. 27, 2000 (JP) .......................................... 2000-126924

(51) Int. Cl.[7] .......................... F04B 17/00; F04B 35/04; F16M 1/00
(52) U.S. Cl. ............. 417/363; 417/423.14; 417/423.15; 248/638
(58) Field of Search ............................. 417/363, 423.15, 417/423.14; 248/638, 636, 567, 671

(56) References Cited

U.S. PATENT DOCUMENTS

| | | | | |
|---|---|---|---|---|
| 1,815,315 A | * | 7/1931 | Kettering .................... | 248/575 |
| 1,935,179 A | * | 11/1933 | Orear ......................... | 417/363 |
| 1,957,526 A | * | 5/1934 | Brown ........................ | 230/58 |
| 2,915,265 A | * | 12/1959 | Tiger .......................... | 248/575 |
| 4,447,034 A | * | 5/1984 | Gottlob ....................... | 248/634 |
| 5,295,671 A | * | 3/1994 | Nakagaki et al. ........... | 248/638 |

FOREIGN PATENT DOCUMENTS

JP 54036802 3/1979

* cited by examiner

*Primary Examiner*—Cheryl J. Tyler
*Assistant Examiner*—Timothy P. Solak
(74) *Attorney, Agent, or Firm*—Pillsbury Winthrop LLP

(57) ABSTRACT

A vibration-damping device capable of reducing the transmission of noise caused by a water pump of a hybrid vehicle, for example, to a vehicle compartment. The vibration-damping device includes a cushion member, a pump mounting member, and an elastic support member. The cushion member supports the pump, and includes holding portions each with a slit formed between an upper and lower surface thereof for insertion therein of end edges of a pump extension member that extends from the pump. The pump mounting member includes inverted L-shaped cross-section retaining portions provided on an upper surface thereof, the supporting portions being disposed between the retaining portions and the upper surface of the pump mounting member to retain the cushion member to the pump mounting member. The elastic support member engages a lower side of the pump to provide support against lateral deflection of the pump.

22 Claims, 7 Drawing Sheets

VIBRATION-DAMPING DEVICE FOR VEHICLE PUMP

BACKGROUND OF THE INVENTION

1. Field of the Invention

The present invention relates to a vibration-damping device, and more specifically to a vibration damping-device for pumps mounted in vehicles.

2. Description of the Related Art

Recently, in order to reduce undesirable effects on the environment, hybrid vehicles, electric vehicles and other non-gasoline powered vehicles have been developed. In these vehicles, water pumps are used for cooling inverters, which are provided in motors serving as power sources. The rotation of the water pump components causes vibration that is transmitted to vehicle compartments to cause noise therein.

As shown in FIGS. 1 and 2, a water pump 10 normally includes a main body 12 and a leg 14, which has a generally trapezoidal section and is provided at the bottom of the main body 12. The water pump 10 is secured to a side member M of a vehicle by inserting the leg 14 in retaining members 16 provided on an upper surface of the side member M. A plurality of annular projections 18 provided in the side faces of the main body 12 connect to water hoses H. With this arrangement, the water pump 10 is secured directly by the retaining members 16 provided in a vehicle body, and, consequently, multiple-frequency vibration of the water pump 10 is transmitted to the vehicle compartment via the side member M. This transmitted vibration is undesirable noise.

This noise is not a serious problem in conventional-engine vehicles because the noise is drowned out the engine itself, which causes even greater noise. However, in hybrid vehicles with the engines off, and in electric vehicles, such transmitted noise is a serious problem.

SUMMARY OF THE INVENTION

Therefore, there is a need to provide a vibration-damping device for a pump that is mounted to a vehicle which is capable of decreasing the transmission of noise to the passenger compartment.

Accordingly, the present invention provides a vibration-damping device for supporting a pump installed in a vehicle, the vibration-damping device comprising a cushion member, a pump mounting member, and an elastic support member. The cushion member supports the pump, and includes holding portions each with a slit formed between an upper and lower surface thereof for insertion therein of end edges of a pump extension member that extends from the pump. The pump mounting member includes inverted L-shaped cross-section retaining portions provided on an upper surface thereof, the supporting portions being disposed between the retaining portions and the upper surface of the pump mounting member to retain the cushion member to the pump mounting member. The elastic support member engages a lower side of the pump to provide support against lateral deflection of the pump.

Since the cushion member is provided between the main body of the pump and the pump mounting member, vibration caused by the rotation of the pump's internal components, particularly multiple-frequency vibration, is absorbed to greatly reduce the transmission of noise to a vehicle compartment. In addition, since the cushion member is provided to cover and hold end edges of the leg of the pump, the pump is rigidly supported to prevent it from coming loose or disengaging from the pump mounting member, and the pump is also supported in a vibration-damping condition against input of the vibrations from various directions to enhance the vibration-damping effect. By virtue of the support member, the pump is prevented from undesirably leaning due to the deviation of the center of gravity of the pump, to decrease factors causing eccentricity of the pump, and reduce the effect of hose pulsations. Consequently, by virtue of the cushion member and the support member, the transmission of noise to the vehicle compartment is reduced.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION

While the present invention will hereinafter be described in connection with several embodiments thereof, it should be understood that these embodiments are not intended to limit the invention to those embodiments. On the contrary, the invention is intended to cover all alternatives, modifications and equivalents as may be included within the spirit and scope of the invention as defined by the appended claims.

Figure 1:
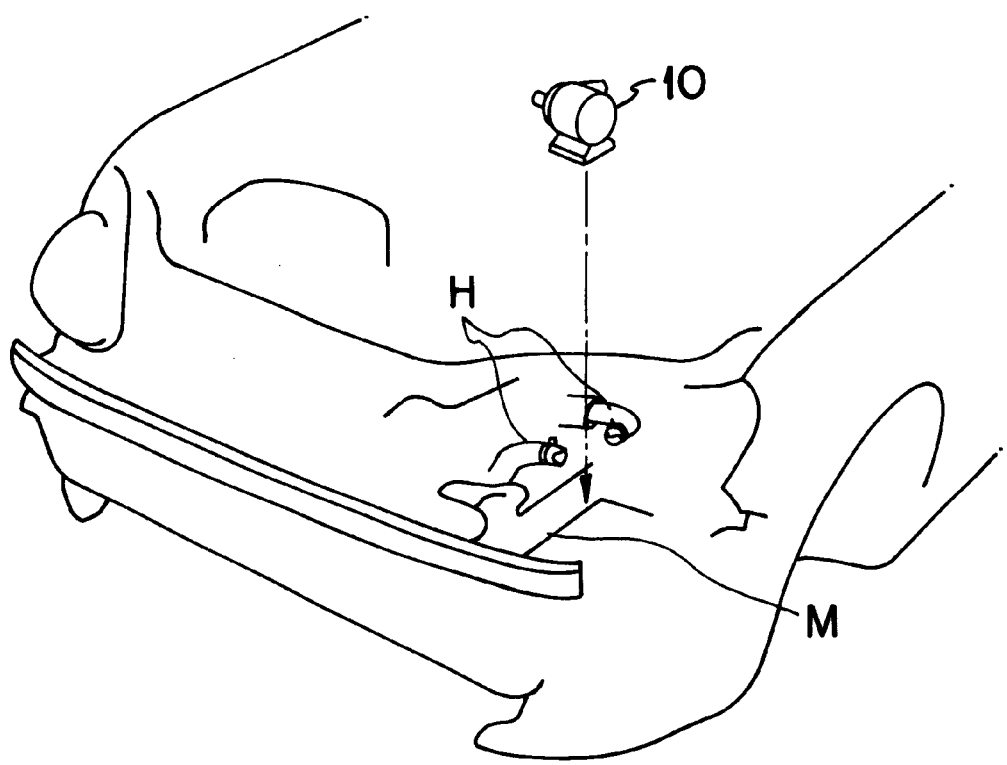
FIG. 1 is a view illustrating the mounting of a water pump on a vehicle.
Figure 3A:
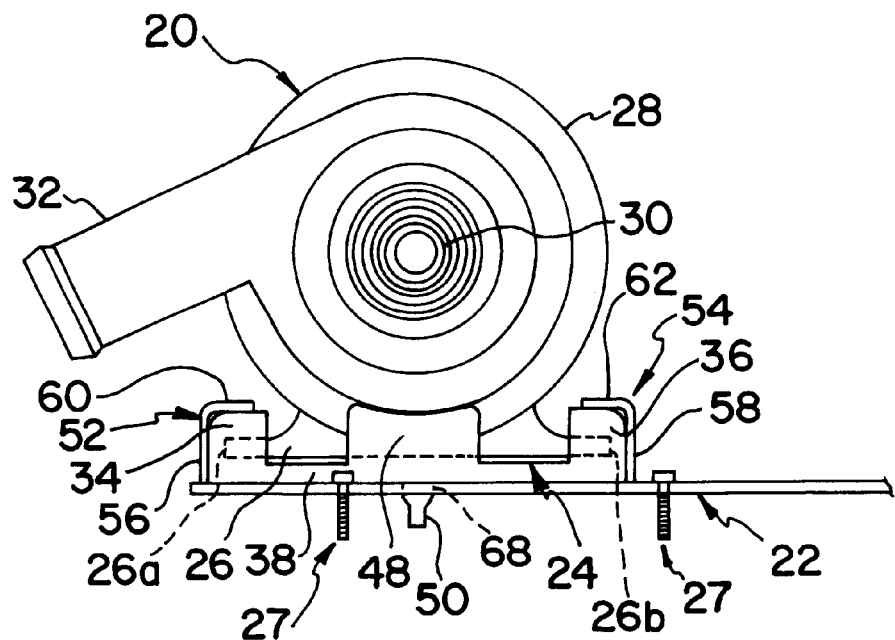
FIG. 3(a) is a view illustrating the construction of a first embodiment of a vibration-damping device in accordance with the present invention.

FIG. 3 illustrates the overall construction of a vibration-damping device according to the first embodiment of the present invention. As shown, a water pump 20 is supported on a bracket 22 which acts as a pump mounting member via a cushion member 24 which covers and holds end edges 26a, 26b of leg 26 of the water pump 20, the leg 26 extending from the water pump main body. The cushion member 24 is preferably made of rubber, discussed below. The water pump 20 is used, for example, as a pump for cooling an inverter, and has a well-known construction. The water pump 20 operates to circulate cooling water introduced into a main body 28 of the water pump 20. The water pump 20 includes an inlet tube 30 for introducing a cooling water into the main body 28. The inlet tube 30 is generally centrally positioned on a front side face of the main body 28 and projects outward of the front side face in a substantially horizontal direction. The cooling water exits the main body 28 of the pump 20 via an outlet tube 32, which may project from a left side face of the main body 28 in a tangential direction. The inlet and outlet tubes 30, 32, are, respectively, connected to cooling water hoses H, as shown in FIG. 1. Terminals (not shown) for supplying an electric current to the water pump 20 are provided above the main body 28 thereof.

The leg 26 of the water pump 20 has a generally trapezoidal section and projects downwardly from a bottom of the main body 28 while gradually widening toward projecting ends thereof. A bottom surface of the leg 26 is rectangular and flat. The ends 26a, 26b of the leg 26 (left side and right side in FIG. 3) are disposed and held within slits 40, 42 formed between an upper and lower surface 25, 27 of the cushion member 24 for supporting the pump.

Figure 4A:
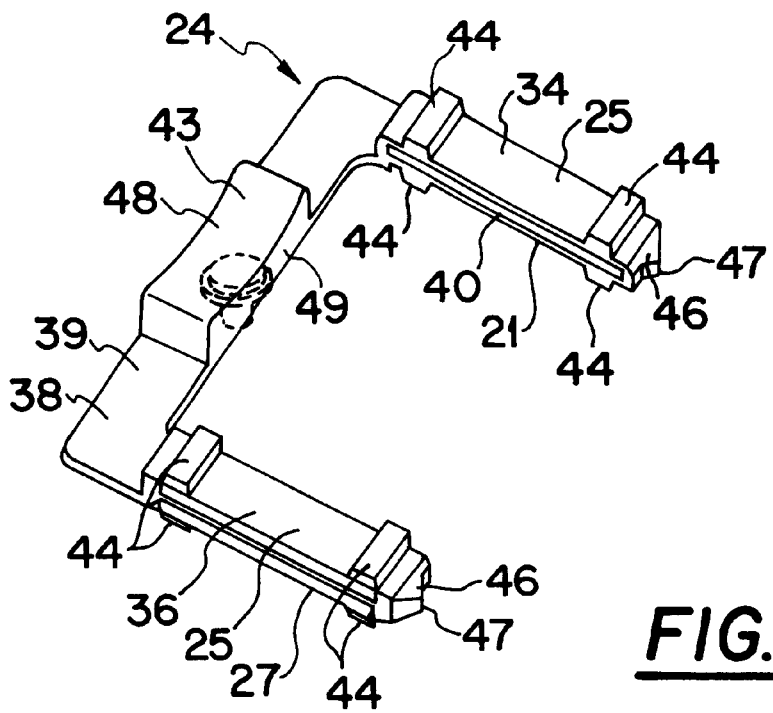
FIG. 4(a) is a perspective view of a cushion member.
Figure 4B:
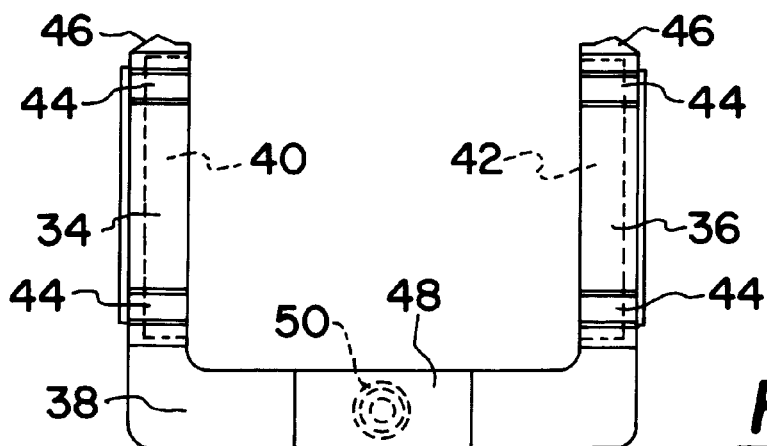
FIG. 4(b) is a top plan view of the cushion member of FIG. 4(a)
Figure 4C:
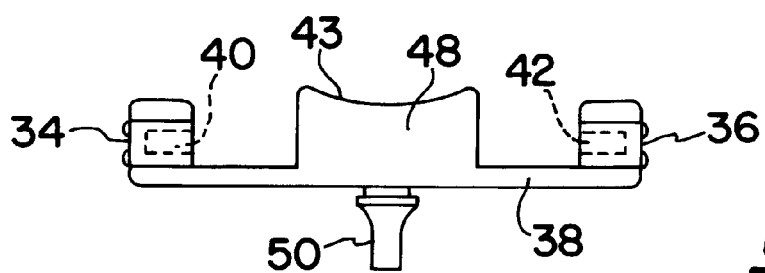
FIG. 4(c) is a front view of the cushion member of FIG. 4(a)

As shown in FIGS. 4(a)–4(c), the cushion member 24 has a U-shaped configuration and includes a left holding portion 34 and a right holding portion 36 connected by a base portion 38. The holding portions 34 and 36 have longitudinal slits 40 and 42, respectively, which are formed in facing inside surfaces thereof, thereby defining a C-shaped cross-section of each holding portion 34, 36. Each holding portion 34, 36 includes transverse ribs 44 formed on upper and lower surfaces of each of the holding portions 34 and 36 near both longitudinal ends thereof. The ribs 44 may have a rectangular configuration. Each holding portion 34, 36 further includes at least one outwardly projecting rib 46 provided on a longitudinal end of each holding portion 34, 36. The base of each rib 46 begins at the longitudinal ends of the holding portions 34, 36 and protrudes in decreasing cross-sectional area to form a ridged section 47.

Figure 3B:
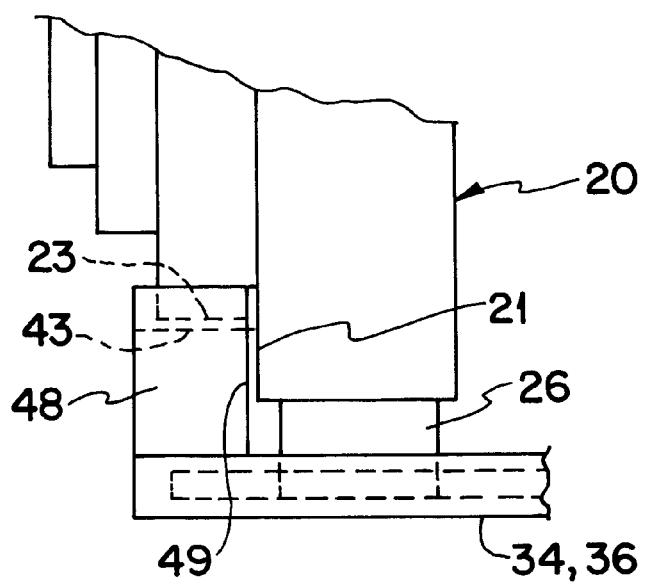
FIG. 3(b) is a side view illustrating the construction of a first embodiment of a vibration-damping device in accordance with the present invention.

A thick-walled, elastic support member 48 is provided and engages a lower side of the water pump 20 to provide support against lateral deflection of the pump. The elastic support member 48, which extends upward from the cushion member 24, may be provided centrally of an upper surface 39 of the base portion 38 of the cushion member 24. When the water pump 20 is mounted, as shown in FIGS. 3 and 3(b), a side portion 49 of the elastic support member 48 abuts (or engages) the main body 28 of the water pump 20 and supports the same from the lower side thereof against lateral deflection of the pump 20. The side portion 49 of said elastic support member 48 generally engages a lower side 21 of the water pump 20, the lower side 21 of the water pump 20 generally facing the side portion 49 of the elastic support member 48. Further, the elastic support member 48 may includes an upper surface portion 43, which generally faces upwards with respect to the cushion member 24, and abuts (or engages) a corresponding surface portion 23 of the main body 28 of the water pump 20 to provide support against vertical deflection of the pump. The upper surface portion 43 of the elastic support member 48 is adapted to abut the surface portion 23 the main body 28 of the water pump 20 and, therefore, may be formed into an arc-shaped configuration, for example, which conforms to the configuration of the surface portion 23 of the main body 28. Alternatively, the upper surface portion 43 can be formed into any shape, depending on the shape of the pump's main body 28. Engagement of the water pump 20 with a side portion 49 and an upper surface portion 43, therefore, provides support against both lateral deflection and vertical deflection, respectively, of the pump. When installed, there may be a small gap between the engagement surfaces of the main body 28 of the pump 20 and the corresponding surfaces of the elastic cushion member 48, as shown in FIG. 3(b). This small gap that may exist will be taken up during operation of the water pump, and thus engagement of the mating surfaces includes any such small gap.

A projection 50 for positioning the cushion member 24 is formed in the center of a lower surface of the base portion 38. The projection 50 engages a through-holes 68 formed in the bracket 22, and may be accommodated within a depression or hole (not shown) in the vehicle when installed therein.

The material of the cushion member 24 is not specifically limited. The cushion member 24 is preferably made of a rubber material having an ASTM hardness (Ho) of 70 or more. More preferably, the rubber material has an ASTM hardness (Ho) of 130 or more. As the ASTM hardness is increased, the cushioning properties are improved. However, if the ASTM hardness of the rubber is too high, the cushion member 24 may be deformed unrecoverably to decrease the durability thereof. Therefore, the hardness of the cushion member may be selected in accordance with the characteristics of the pump. The cushion member 24 may further be made of silicon rubber, which is desirable because it exhibits a comparatively low rubber hardness and excellent cold resistance which enables the physical properties thereof to be maintained even at low temperatures. It is preferable to adjust the resonant frequency of the cushion member 24 lower than the frequency of the rotation of the water pump 20 components.

Figure 5:
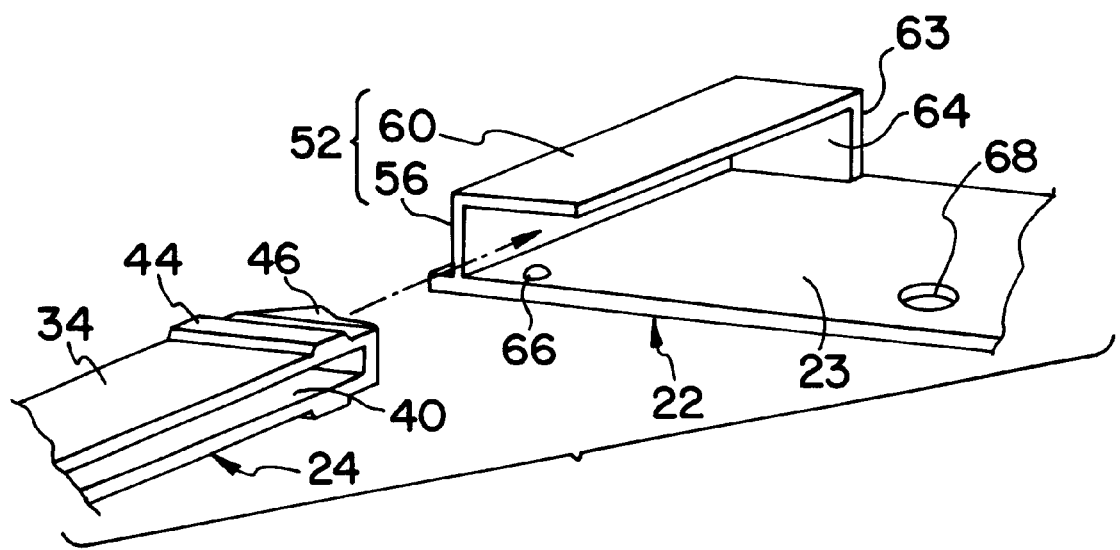
FIG. 5 is a perspective view of one part of the vibration-damping device, which explains the method for mounting the cushion member on s pump mounting member.

As shown in FIGS. 3 and 5, the bracket 22 (i.e., pump mounting member) has a plate-like configuration. The bracket 22 includes a pair of retaining portions 52 and 54 formed on an upper surface 23 of the bracket 22 on the left side and right side thereof for mounting the water pump 20 therein. These retaining portions 52 and 54 have inverted L-shaped configurations, and include vertical walls 56 and 58, respectively, which extend parallel to each other, and upper walls 60 and 62, respectively, which extend from upper end edges of the vertical walls 56 and 58 in facing directions. Each retaining portion 52 and 54 further include a vertical wall 63 connected to upper walls 60 and 62 and the upper surface 23 of the bracket 22. These retaining portions 52 and 54 are arranged such that they closely contact outside surfaces of the holding portions 34 and 36 of the cushion member 24 to retain the same.

The holding portions 34 and 36 of the cushion member 24 are inserted into the retaining portions 52 and 54 from one longitudinal end thereof (i.e., the open end opposite vertical wall 63). As shown in FIG. 5, the inside surface or stopper face 64 of vertical wall 63 provides a stop for each of the left and right holding portions 34, 36. Further, a projection 66 is formed on the upper surface of the bracket 22 so as to face and engage the corresponding longitudinal end of each of the retaining portions 52 and 54 for preventing the holding portions 34 and 36 of the cushion member 24 from sliding out of the retaining portions 52 and 54. By virtue of the stopper face 64 and the projection 66, the holding portions 34 and 36 are positioned on the bracket 22. An opening 68 into which the projection 50 is adapted to be fitted is formed through the bracket 22.

Upon mounting the water pump 20 on the vehicle body, the first, left, and right sides of the bottom of the leg 26 are inserted into the slits 40 and 42 of the holding portions 34 and 36. Next, the holding portions 34 and 36, which hold the ends of the leg 26, are inserted into the retaining portions 52 and 54 of the bracket 22 from the one longitudinal end thereof such that the ribs 44 and 46 are pre-compressed to closely contact the retaining portions 52 and 54. Then, the rib 46 of each of the holding portions 34 and 36 is made to abut the stopper face 64 while the projection 66 is made to abut the base portion 38. Furthermore, the projection 50 of the cushion member 24 is fitted into the opening 69, whereby the cushion member 24 is positioned in a predetermined pre-compressed state. Thus, the water pump 20 is elastically supported by the bracket 22 via the cushion member 24. The bracket 22 is then fixedly secured to the side member M by bolts 27 (FIGS. 1 and 3), or other known fastening mechanisms, and water hoses are connected to the inlet tube 30 and the outlet tube 32, respectively.

Alternatively, the retaining portions 52 and 54 may be directly formed in the vehicle body without using the bracket 22. In such a case, the projection 66 and mounting hole 68 may be formed directly in the vehicle as well.

With the arrangement illustrated in FIG. 3, since the water pump 20 is supported in a vibration-damping condition by interposing the cushion member 24 between the water pump 20 and the bracket 22, vibration, particularly multiple-frequency vibration, which is caused by the rotation of the internal components (not shown) of the water pump 20, is absorbed, thereby reducing noise transmission to a vehicle compartment.

Furthermore, since the leg 26 of the water pump 20 is held by the holding portions 34 and 36 of the cushion member 24, and the holding portions 34 and 36 are retained by the retaining portions 52 and 54, each having an inverted L-shaped cross-section, the water pump 20 is retained securely and is supported elastically from all of upper, lower, front, rear, left, arid right sides thereof. Therefore, vibration is effectively reduced. In addition, since the rib 46 is provided at one longitudinal end of each of the holding portions 34 and 36 and the projection 66 is provided at the other longitudinal end thereof, pre-compressing and positioning of the cushion member 24 are facilitated. By virtue of the stopper face 64 and the projection 66, the water pump 20 is positioned on the bracket 22, and the water pump 20 can be prevented from coming loose or coming out of the bracket 22.

The water pump 20 has the inlet tube 30 and the outlet tube 32, each protruding sidewardly so that the center of gravity of the water pump 20 deviates from the center of the main body 28. In this case, the posture of the water pump 20 tends to lean toward the deviated center of gravity, that is toward the inlet tube 30, for example (frontwardly in FIG. 3). In contrast, with the device of the present invention wherein the support member 48 is provided in the cushion member 24 so as to abut the main body 28 on the side of the inlet tube 30 and support it from the lower side thereof, the leaning of the pump posture can be prevented, and consequently the factors causing the deviation in the vibration mode of the water pump are reduced, and the effect of pulsations of water hoses can be reduced, whereby the vibration-damping effect is enhanced.

Figure 6:
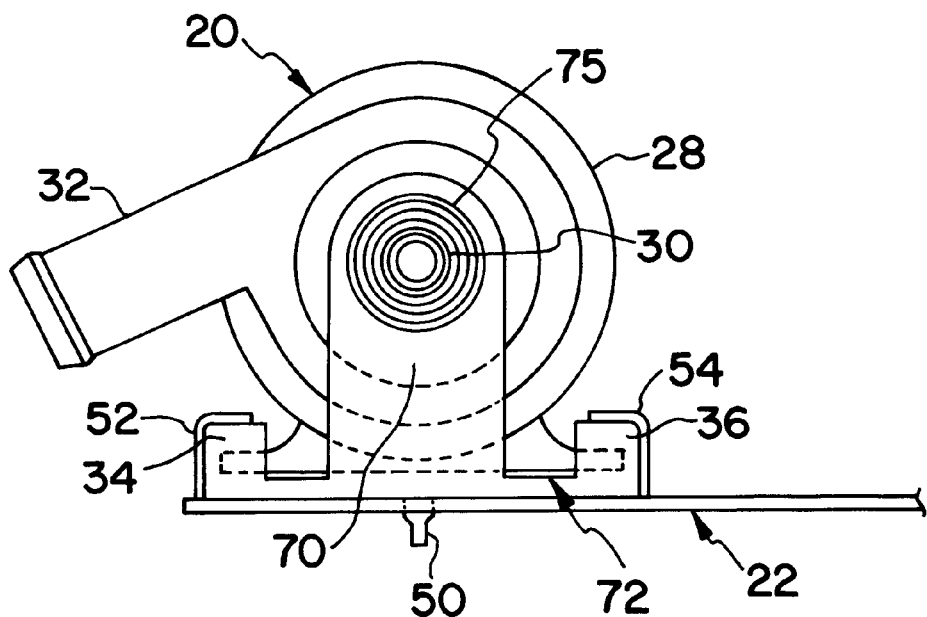
FIG. 6 is a view illustrating the construction of a second embodiment of a vibration-damping device in accordance with the present invention.

FIG. 6 illustrates a second embodiment of a vibration-damping device in accordance with the present invention. As shown, a support member 70 of a cushion member 72 (which is also preferably made of rubber, as in the first embodiment) extends upwardly to surround the inlet tube 30. In this embodiment, the support member 70 may include a through-hole 75 into which the inlet tube 30, which may extend substantially horizontally, is inserted therein to engage the surface portion of the through-hole 75. By supporting the water pump 20 in this manner, vertical deflection and also lateral deflection of the water pump is resisted. Also, a side portion of the support member 70 may engage a side portion of the main body 28 of the water pump 20 to further support the pump against lateral deflection. The remainder of the structure of the device of the second embodiment is identical to that of the first embodiment illustrated in FIGS. 3 to 5, and elements to those in FIGS. 3 to 5 are given the same reference numerals. By providing the support member 70 near the center of the rotation of the water pump 20, the vibration-damping effect is enhanced. Because of the enhanced vibration-damping effect, this arrangement of the second embodiment is preferred where there is sufficient space for mounting the water pump in the vehicle.

Figure 2:
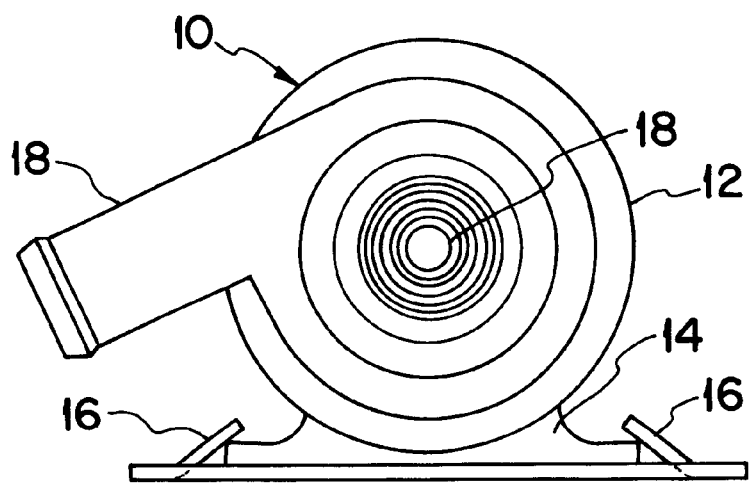
FIG. 2 is a view illustrating the construction of a conventional vibration-damping device.
Figure 7A:
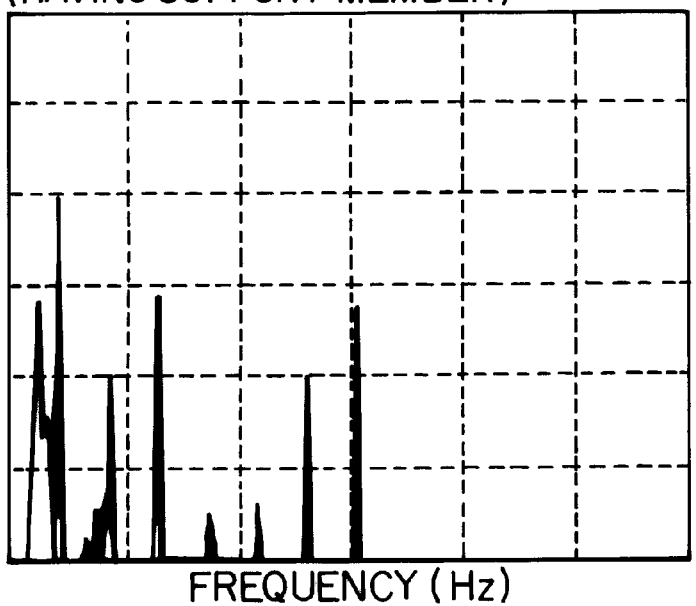
FIG. 7(a) is a graph showing the vibration characteristics of the first embodiment of the vibration damping device in accordance with the present invention.
Figure 7B:
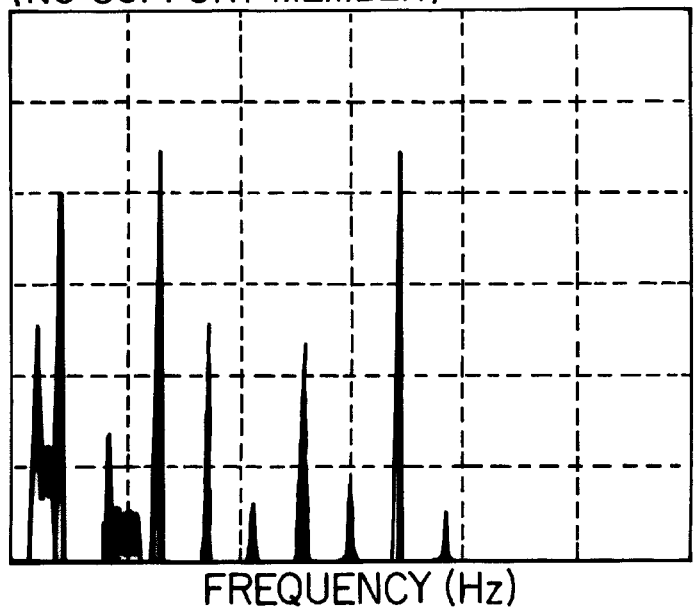
FIG. 7(b) is a graph showing the vibration characteristics of the device which includes the cushion member but does not include the support member.

TABLE 1 shows the vibration-damping effect achieved by the first embodiment of the device in accordance with the present invention in comparison with that of the conventional arrangement illustrated in FIG. 2 and that of the arrangement where no support member is provided in the cushion member 24. FIGS. 7(a) and 7(b) show the vibration characteristics in the arrangement of a first embodiment and the arrangement where no support member is provided in the cushion member 24, respectively. As is apparent from TABLE 1 and FIGS. 7(a) and 7(b), the vibration level, particularly multiple-frequency vibration, is greatly decreased. Also, the vibration level in the first embodiment wherein the support member 48 is provided (FIG. 7(a)) is lower than that in the arrangement wherein no support member is provided (FIG. 7(b)). These results show that, with the arrangement of the present invention, the vibration is reduced more effectively.

TABLE 1

| Arrangement | Vibration Level | | |
| --- | --- | --- | --- |
| | 44 Hz | 130 Hz | 260 Hz |
| Conventional arrangement | 26 dB | 26 dB | 23 dB |
| No support member | 10 dB | 13 dB | 3 dB |
| First embodiment of present Invention | 10 dB | 4 dB | 0 dB |

Figure 8A:
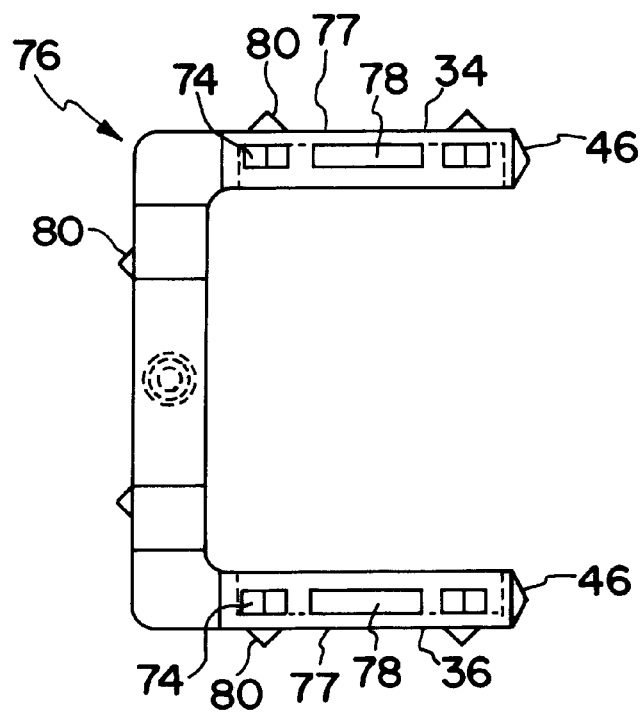
FIG. 8(a) is a top plan view of the cushion member of a third embodiment of a vibration-damping device in accordance with the present invention.
Figure 8B:
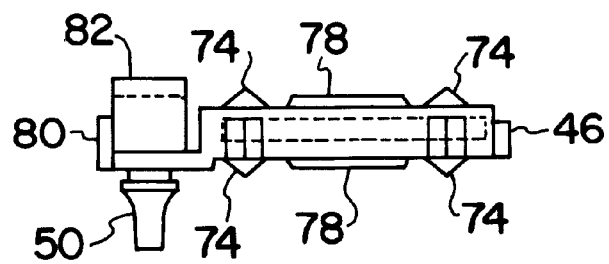
FIG. 8(b) is a side view of the cushion member of FIG. 8(a)
Figure 8C:
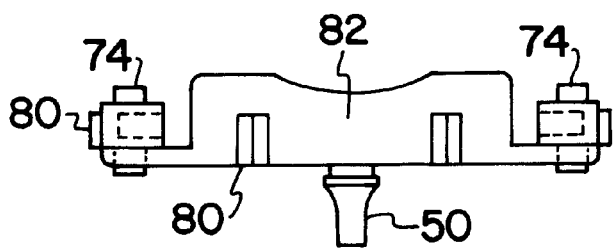
FIG. 8(c) is a front view of the cushion member of FIG. 8(a)

FIGS. 8(a), 8(b) and 8(c) illustrate a third embodiment of the vibration-damping device in accordance with the present invention. As shown, ribs 74 are formed on upper and lower surfaces of a cushion member 76. Each rib 74 has a rectangular configuration that protrudes in decreasing cross-sectional area to form a ridged section. Stopper faces 78 are also formed on the upper and lower surfaces of the cushion member 76 (which is preferably made of rubber, as in the first and second embodiments) between the ribs 74 so as to project by a height lower than that of the ribs 74. Furthermore, ribs 80, each having a ridged section, are formed on side surfaces 77 of the cushion member 76 and a support member 82. The remainder of the structure of the device of the third embodiment is identical to that of the first embodiment illustrated in FIGS. 3 to 5. In FIGS. 8(*a*), 8(*b*) and 8(*c*), parts similar to those in FIGS. 3 to 5 are given the same reference numerals as therein.

By forming the ribs 74, each having a ridged section, the contact area of the ribs 74 against the retaining portions 52 and 54 is decreased and, consequently, the effective rubber hardness becomes lower than that of the ribs. Thus, the cushion member acts as though it has a lower hardness. Thus, even if harder rubber is used, the overall hardness is that of lower hardness rubber. Consequently, the cushioning properties can be improved without lowering the durability of the cushion member 24 and provides more design flexibility. When the main body 28 of the water pump 20 displaces greatly, the stopper faces 78 abut the retaining portions 52 and 54 to serve as stoppers, thereby decreasing input of vibration to the ribs 74 and improving the durability of the cushion member 76.

By forming the ribs 80, each having a ridged section, in the side surface of the support member 82, the width of the support member 82 is increased to further enhance the effect of preventing the leaning of the water pump.

Figure 9A:
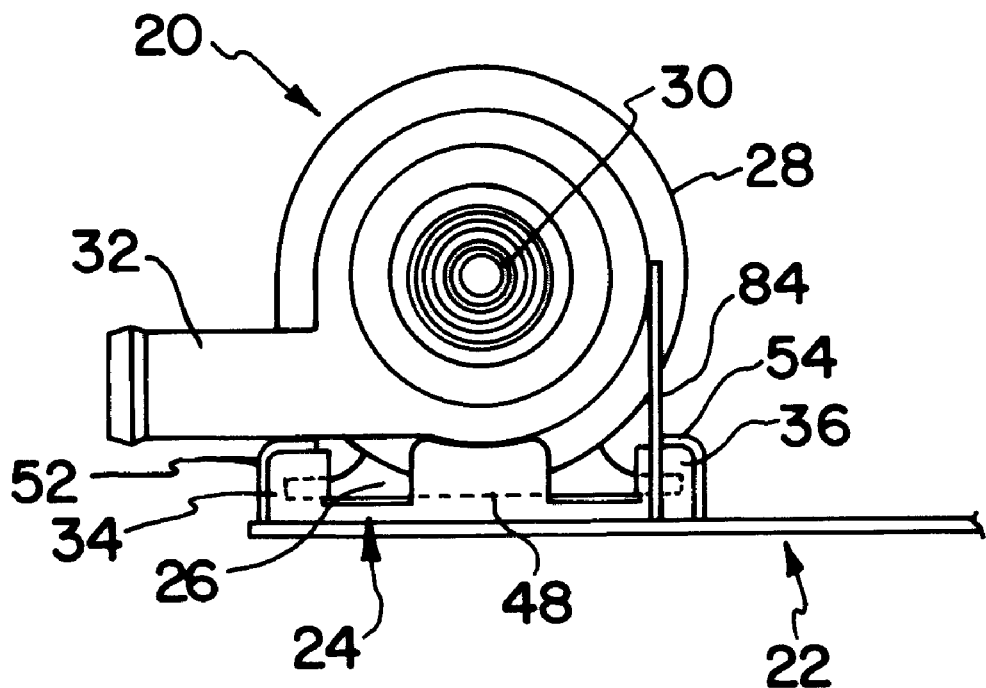
FIG. 9(a) is a front view of a fourth embodiment of a vibration-damping device in accordance with the present invention.
Figure 9B:
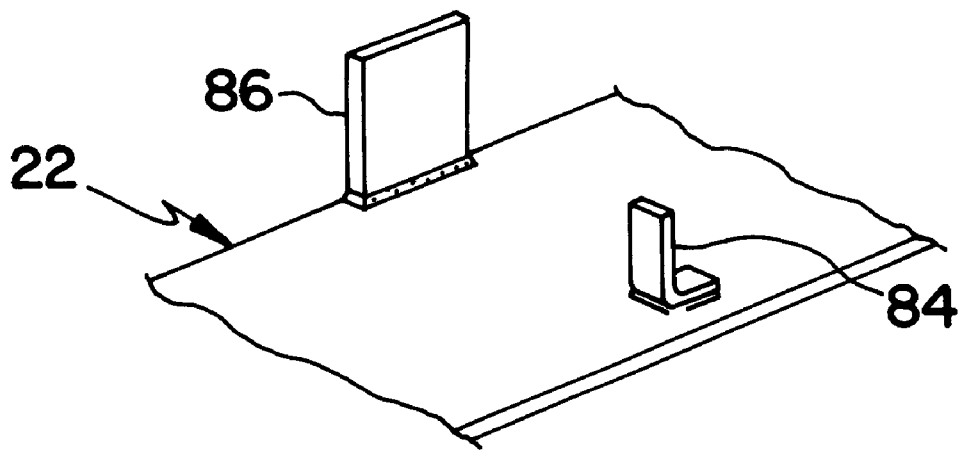
FIG. 9(b) is a perspective view of one portion of a pump mounting member used in the forth embodiment.

FIGS. 9(*a*) and 9(*b*) illustrate a fourth embodiment of the vibration-damping device in accordance with the present invention. As shown in FIG. 9(*a*), water hoses are assembled by mounting an end of a water hose around the outlet tube 32 of the water pump 20, and securing by a clump, for example. At this time, the water pump 20 may lean on the opposite side to the water hose, namely on the right side in FIG. 9(*a*), and consequently the cushion member 24 which is composed of a comparatively soft rubber material may come loose relative to the bracket 22 with the result that the assembling of the water hose may become inferior. In order to solve this problem, with the fourth embodiment, as shown in FIG. 9(*b*), a stopper wall 84 is provided near a front edge of the bracket 22 so as to vertically stand in a facing relationship with a side face of the main body 28 on the opposite side of the outlet tube 32. In addition, another stopper wall 86 may be provided similarly to the stopper wall 84 so as to face another side face of the main body 28 on the opposite side of the inlet tube 30.

These stopper walls 84 and 86 are respectively spaced from the main body 28 so as to abut the main body 28 only when the water hose is assembled, and so as not to abut the main body 28 during using of the water pump 20. As shown in FIG. 9(*b*), these stopper walls 84 and 86 are provided by securing separately prepared members to the bracket 22 by welding, for example.

The thus provided, stopper walls 84 and 86 prevent the cushion member 24 from coming loose upon assembling water hoses. Since there are provided spaces between the stopper walls 84 and 86 and the main body 28 of the water pump 20, the stopper walls 84 and 86 do not abut the main body 28 while the water pump 20 is used, and consequently do not affect vibration, noise or the like which occurs therearound.

While the invention has been described with reference to the certain illustrated embodiments, the words which have been used herein are words of description, rather than words or limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A vibration-damping device for supporting a pump installed in a vehicle, the vibration-damping device comprising:
   a cushion member to support said pump, said cushion member including holding portions each with a slit formed between an upper and lower surface thereof for insertion therein of end edges of a pump extension member that extends from said pump;
   a pump mounting member including inverted, L-shaped cross-section retaining portions provided on an upper surface thereof, the holding portions being disposed between said retaining portions and said upper surface of said pump mounting member to retain said cushion member to said pump mounting member; and
   an elastic support member engaging a lower side of said pump to provide support against lateral deflection of said pump.

2. A vibration-damping device as claimed in claim 1, wherein said support member is formed integrally with said cushion member.

3. A vibration-damping device as claimed in claim 1, wherein said cushion member is made of a rubber material.

4. A vibration-damping device as claimed in claim 3, wherein said rubber material is silicon rubber.

5. A vibration-damping device as claimed in claim 1, wherein said holding portions include a left holding portion and a right holding portion, each holding portion having formed therein at least one of said slits.

6. A vibration-damping device as claimed in claim 5, wherein cushion member further includes a base portion that connects said left and right holding portions.

7. A vibration-damping device as claimed in claim 6, wherein said support member is integral with said base portion of said cushion member.

8. A vibration-damping device as claimed in claim 6, wherein each of said left holding portion and said right holding portion has a C-shaped cross-section.

9. A vibration-damping device as claimed in claim 7, wherein said support member is disposed intermediate said left holding portion and said right holding portion.

10. A vibration-damping device as claimed in claim 1, wherein each of said retaining portions includes a wall portion transverse to the longitudinal direction of the of the retaining portions and connected to an upper part thereof and said upper surface of said support member to provide a stop for the holding portions of the cushion member.

11. A vibration-damping device as claimed in claim 10, wherein at least one outwardly projecting rib is provided on a longitudinal end of each of said holding portions, said longitudinal end facing said wall portions, at least one of said ribs being interferingly engaged with one of said wall portions so as be in a pre-compressed state.

12. A vibration-damping device as claimed in claim 11, wherein each of said at least one rib begins at said longitudinal end of said supporting portions and protrudes in decreasing cross-sectional area to form a ridged section.

13. A vibration-damping device as claimed in claim 1, wherein said pump mounting member has a stopper member for positioning said cushion member thereon.

14. A vibration-damping device as claimed in claim 1, wherein said holding portions further include second ribs protruding from said upper and lower surfaces thereof.

15. A vibration-damping device as claimed in claim 14, wherein said second ribs interferingly engage an underside of said retaining portions so as to be in a pre-compressed state.

16. A vibration-damping device as claimed in claim 15, wherein said second rib are transverse to the longitudinal direction of the holding portions.

17. A vibration-damping device as claimed in claim 1, wherein a side portion of said elastic support member engages said lower side of said pump to provide support against said lateral deflection of said pump, said lower side generally facing said side portion of said elastic support member.

18. A vibration-damping device as claimed in claim 1, wherein said elastic support member includes a surface portion generally facing upwards with respect to said cushion member and is engaged with a corresponding surface portion of said pump to provide support against vertical deflection of said pump.

19. A vibration-damping device as claimed in claim 18, wherein said surface portion of said elastic support member includes a surface of a through-hole formed in said elastic support member, a substantially horizontally extending tube portion of said pump being disposed therein to provide support against said vertical deflection and lateral deflection of said pump.

20. A vibration-damping device as claimed in claim 1, wherein said elastic support member extends upward from the cushion member.

21. A vibration-damping device as claimed in claim 1, wherein said pump mounting member is to be fixedly attached to said vehicle.

22. A vibration-damping device as claimed in claim 1, wherein said holding portions further include ribs protruding from at least one side thereof and are engaged with a corresponding side surface of one of said retaining portions when inserted therein.

* * * * *